US012172866B2

(12) United States Patent
Laine et al.

(10) Patent No.: US 12,172,866 B2
(45) Date of Patent: Dec. 24, 2024

(54) INSTALLATION PLATFORM FOR INSTALLING AN ELEVATOR DURING CONSTRUCTION OF A BUILDING

(71) Applicant: Kone Corporation, Helsinki (FI)

(72) Inventors: Janne Laine, Helsinki (FI); Matti Rasanen, Helsinki (FI); Markku Haapaniemi, Helsinki (FI); Aki Haikonen, Helsinki (FI); Otto Lanz, Helsinki (FI); Sakari Korvenranta, Helsinki (FI); Anssi Venho, Helsinki (FI); Jorma Mustalahti, Helsinki (FI); Jaakko Kahila, Helsinki (FI); Jari Ryhanen, Helsinki (FI); Mika Ijas, Helsinki (FI); Mikko Kukkola, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/168,054

(22) Filed: Feb. 13, 2023

(65) Prior Publication Data

US 2023/0192447 A1 Jun. 22, 2023

Related U.S. Application Data

(63) Continuation of application No. PCT/EP2021/075062, filed on Sep. 13, 2021.

(30) Foreign Application Priority Data

Sep. 14, 2020 (EP) .................................... 20195936

(51) Int. Cl.
*B66B 19/00* (2006.01)

(52) U.S. Cl.
CPC .................................... *B66B 19/00* (2013.01)

(58) Field of Classification Search
CPC ....... B66B 19/00; B66B 19/002; B66B 19/04; B66B 19/005; B66B 19/007
See application file for complete search history.

(56) References Cited

U.S. PATENT DOCUMENTS

2005/0252726 A1* 11/2005 Det ....................... B66B 5/0081 187/401
2020/0180912 A1* 6/2020 Li ....................... B66B 11/0446

FOREIGN PATENT DOCUMENTS

CN 113277407 A * 8/2021 ............... B28D 1/14
EP 1270489 A1 1/2003

(Continued)

OTHER PUBLICATIONS

Machine translation of EP 1270489.*

(Continued)

*Primary Examiner* — Diem M Tran
(74) *Attorney, Agent, or Firm* — Harness, Dickey & Pierce, P.L.C.

(57) ABSTRACT

The installation platform comprises two decks and a support frame comprising horizontal support beams supporting a respective deck and vertical support beams. The installation platform has a width in a first horizontal direction between the guide rails, a depth in a second horizontal direction perpendicular to the first horizontal direction. The installation platform is guided movably via guide means on the guide rails. At least one of the width and the depth of the installation is adjustable in order to adjust the horizontal dimensions of the installation platform according to the horizontal dimensions of the shaft.

16 Claims, 12 Drawing Sheets

(56) References Cited

FOREIGN PATENT DOCUMENTS

| | | | | | |
|---|---|---|---|---|---|
| EP | 1849732 | A1 | * | 10/2007 | ........... B66B 5/0081 |
| EP | 3085657 | A1 | | 10/2016 | |
| JP | 2888394 | B2 | * | 5/1999 | |
| JP | 2005178948 | A | * | 7/2005 | ........... B66B 19/002 |
| WO | WO-2015003964 | A1 | * | 1/2015 | ............. B66B 19/00 |
| WO | WO-2015126863 | A2 | | 8/2015 | |

OTHER PUBLICATIONS

Machine translation of WO 2015/003965.*
Machine Translation of CN 113277407.*
International Search Report PCT/ISA/210 and Written Opinion PCT/ISA/237 for International Application No. PCT/EP2021/075062 dated Dec. 20, 2021.

* cited by examiner

117

INSTALLATION PLATFORM FOR INSTALLING AN ELEVATOR DURING CONSTRUCTION OF A BUILDING

CROSS-REFERENCE TO RELATED APPLICATION

This application is a continuation of PCT International Application No. PCT/EP2021/075062 which has an International filing date of Sep. 13, 2021, and which claims priority to European Patent Application No. 20195936.8 filed Sep. 14, 2020, the entire contents of both of which are incorporated herein by reference.

FIELD

The invention relates to an installation platform and a method for installing an elevator during construction of a building.

BACKGROUND

The construction of an elevator may especially in high-rise buildings be done in parts along the height of the shaft. The guide rails and the landing doors may first be installed to a first height in the shaft, then to a second height etc. A construction time elevator may then be operated on the already installed lower portion of the shaft while the construction of the elevator is going on in a higher portion of the shaft.

An installation platform may be used for the construction of the elevator above the construction time elevator operating in the lower portion of the shaft.

Prior art installation platforms are constructed to meet the horizontal dimensions of a specific shaft. Prior art installation platforms are used only in said shaft during the construction of the elevator after which they are dismantled.

SUMMARY

An object of the present invention is to present an improved installation platform and method for installing an elevator during construction of a building.

The installation platform for installing an elevator during construction of a building is defined in claim 1.

The method for installing an elevator during construction of a building is defined in claim 13.

The adjustability of at least one of the width and the depth of the installation platform makes it possible to adjust the installation platform on the site to different shafts having different horizontal dimensions. The same installation platform may be used in shafts with different distances between the guide rails and/or different distances between the back wall and the front wall of the shaft.

The embodiment in which the width of the installation platform is adjustable in the first horizontal direction between the guide rails makes it possible to adjust the installation platform on the site to shafts with different distances between guide rails.

The embodiment in which the depth of the installation platform is adjustable in the second horizontal direction between the back wall and the front wall of the shaft makes it possible to adjust the installation platform on the site to shafts with different distances between back wall and the front wall. A wide gap between the front edge of the installation platform and the landing may thus be eliminated.

The embodiment in which the width of the installation platform are adjustable in the first horizontal direction between the guide rails and the depth of the installation platform is adjustable in the second horizontal direction between the back wall and the front wall of the shaft makes it possible to adjust the installation platform on the site to different shafts with different distances between the guide rails and to different shafts with different distances between the back wall and the front wall.

The adjustability of the width and/or the depth of the installation platform i.e. the horizontal dimensions of the decks and the support frame makes it possible to adapt the installation platform on the site to different shafts. The installation platform becomes thus re-usable i.e. it can be used in virtually any shaft. The installation platform may be removed and transported to another construction site when the installation platform is not any more needed at the first site.

The adjustable installation platform minimizes the danger of accidents when technicians enter and leave the installation platform through the landings. The risk for objects falling from the installation platform is also reduced.

The parts of the installation platform may be fabricated at factory premises outside the elevator installation site. The parts of the installation platform may then be transported to the elevator installation site after which the installation platform may be assembled on the elevator installation site. The installation platform may on the other hand be prefabricated and assembled into one or several transportable modules at factory premises. The module or modules may then be transported to the construction site with conventional transport methods. The installation platform may be lifted into the shaft in an early stage of the construction of the shaft and the building. The use of the installation platform may be started when the shaft has reached a height making it possible to start the installation of the elevator.

The installation platform may be used to install the guide rails, the shaft doors and any other equipment in the shaft which might be needed in the elevator.

The installation platform may be used in manual and/or in automatic elevator installations. One or more mechanics may work on the decks during the installation of the elevator. Another possibility is to provide the decks with one or more industrial robots performing the installation of the elevator. It is naturally also possible to combine the manual and the automatic installation in any desired way.

DRAWINGS

The invention will in the following be described in greater detail by means of preferred embodiments with reference to the attached drawings, in which.

Figure 5:
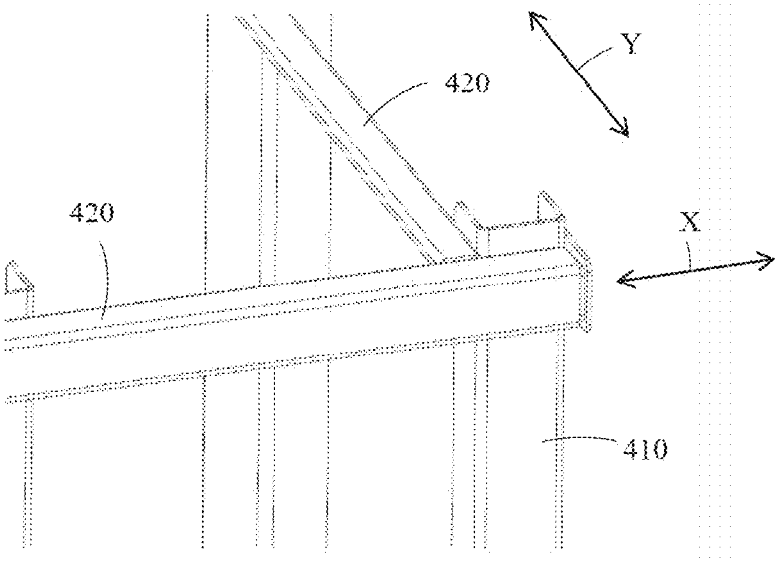
Figure 6:
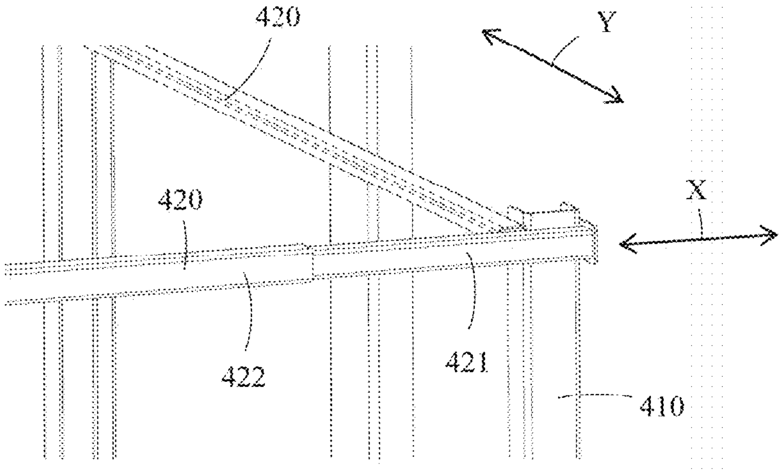
Figure 7:
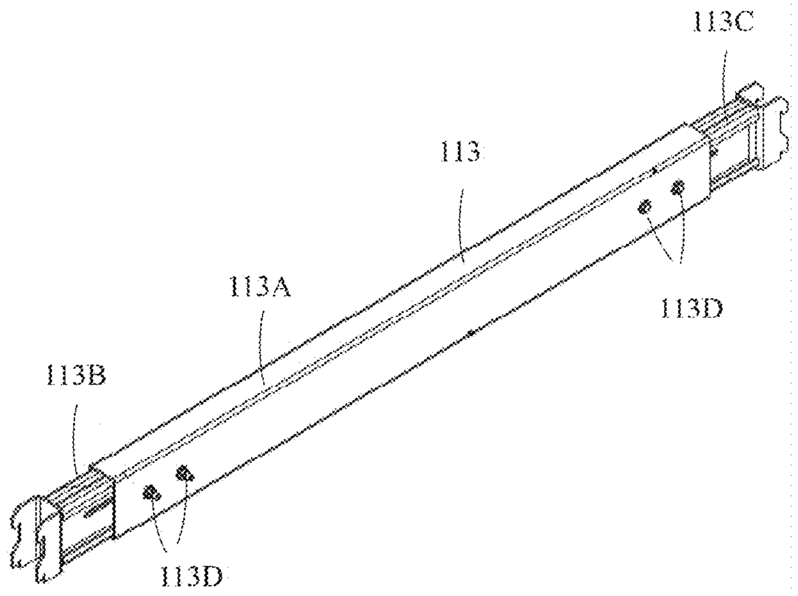
Figure 8:
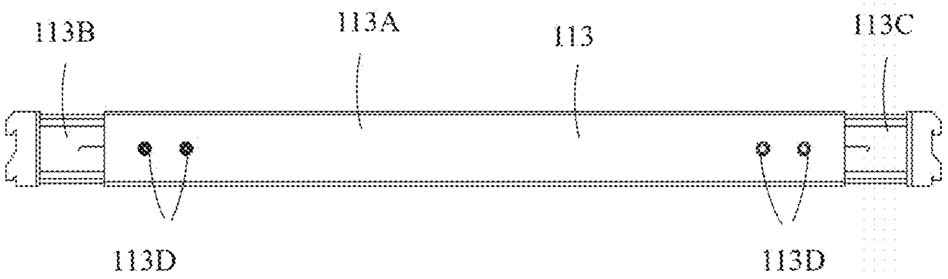
Figure 9:
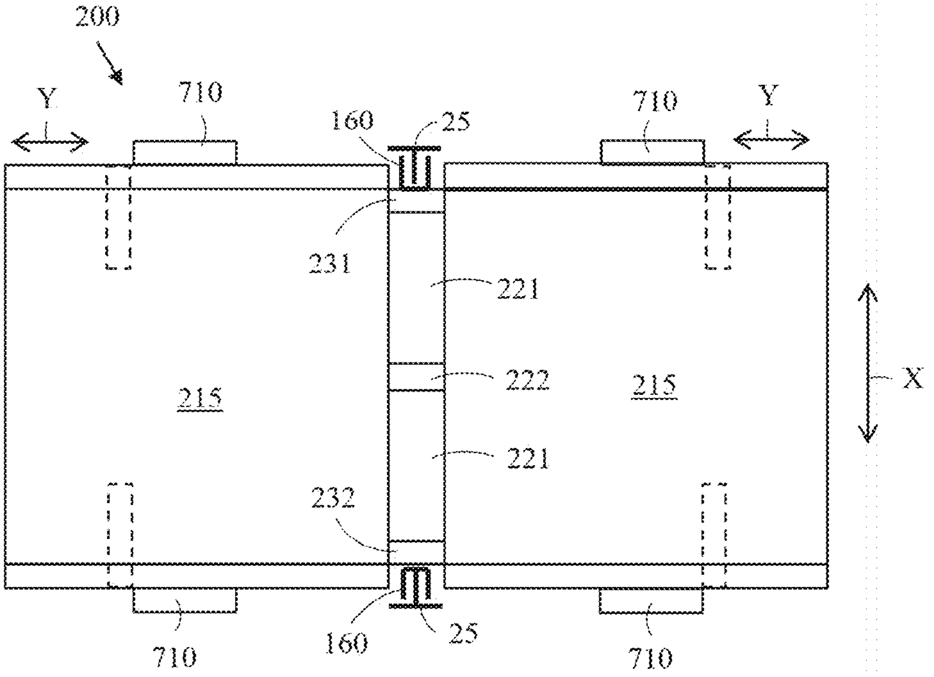
Figure 10:
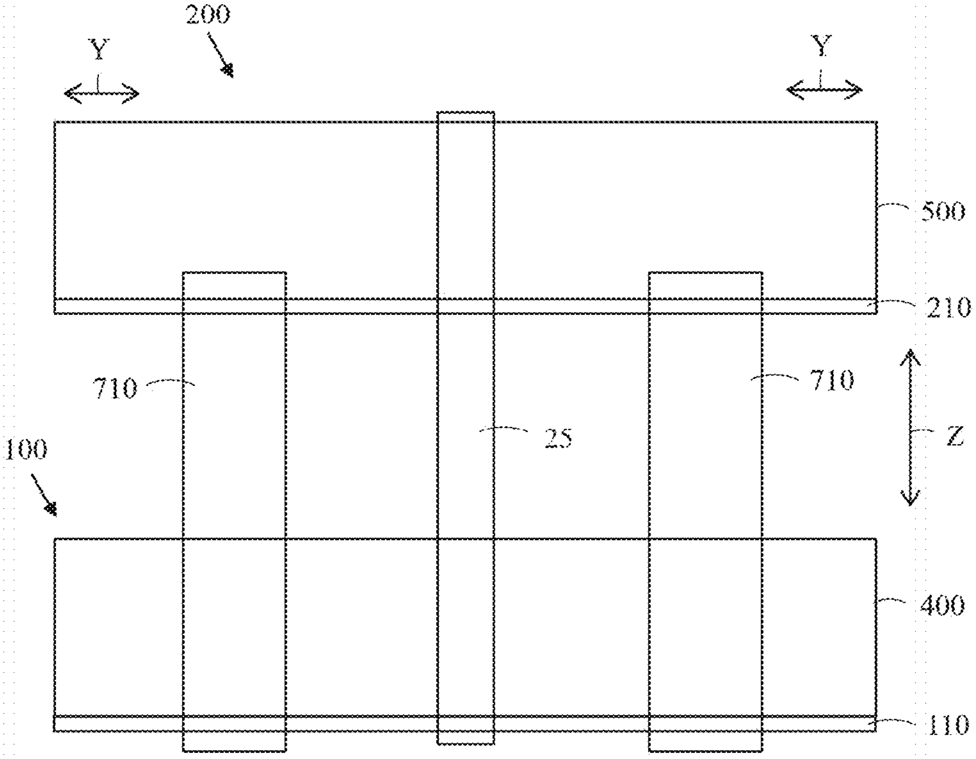
Figure 11:
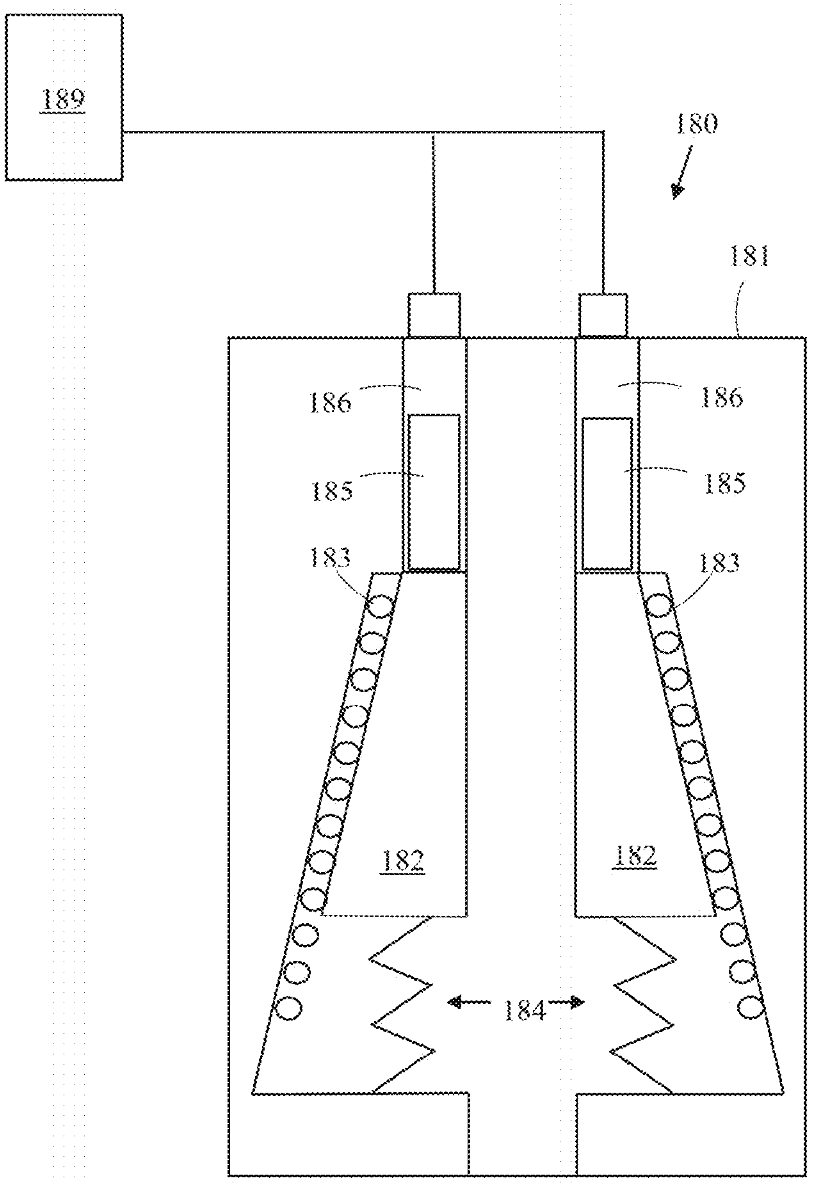
Figure 12:
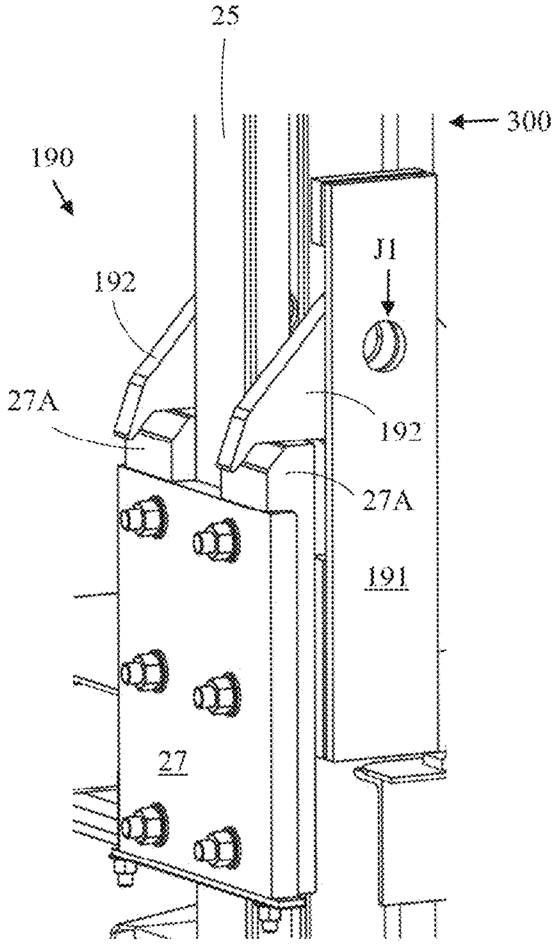
Figure 13:
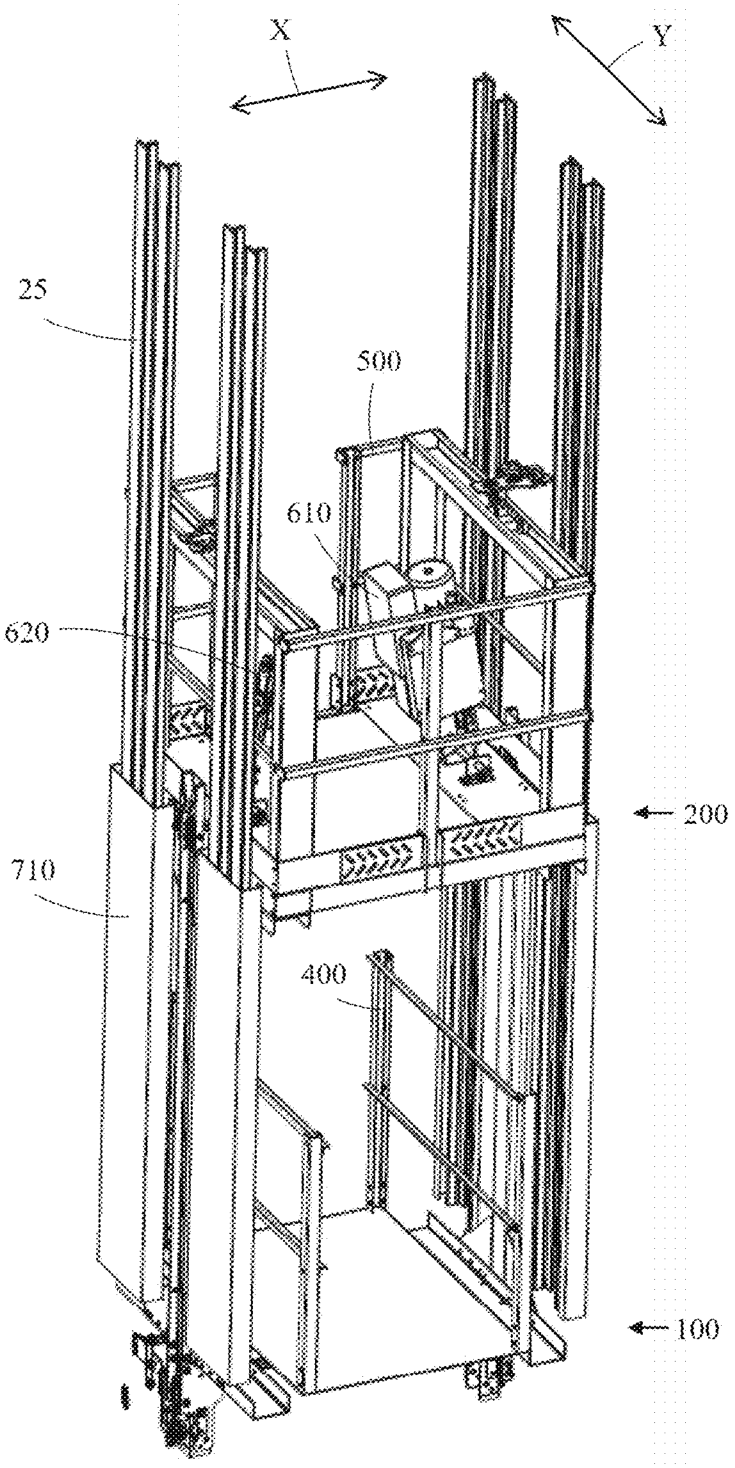
Figure 14:
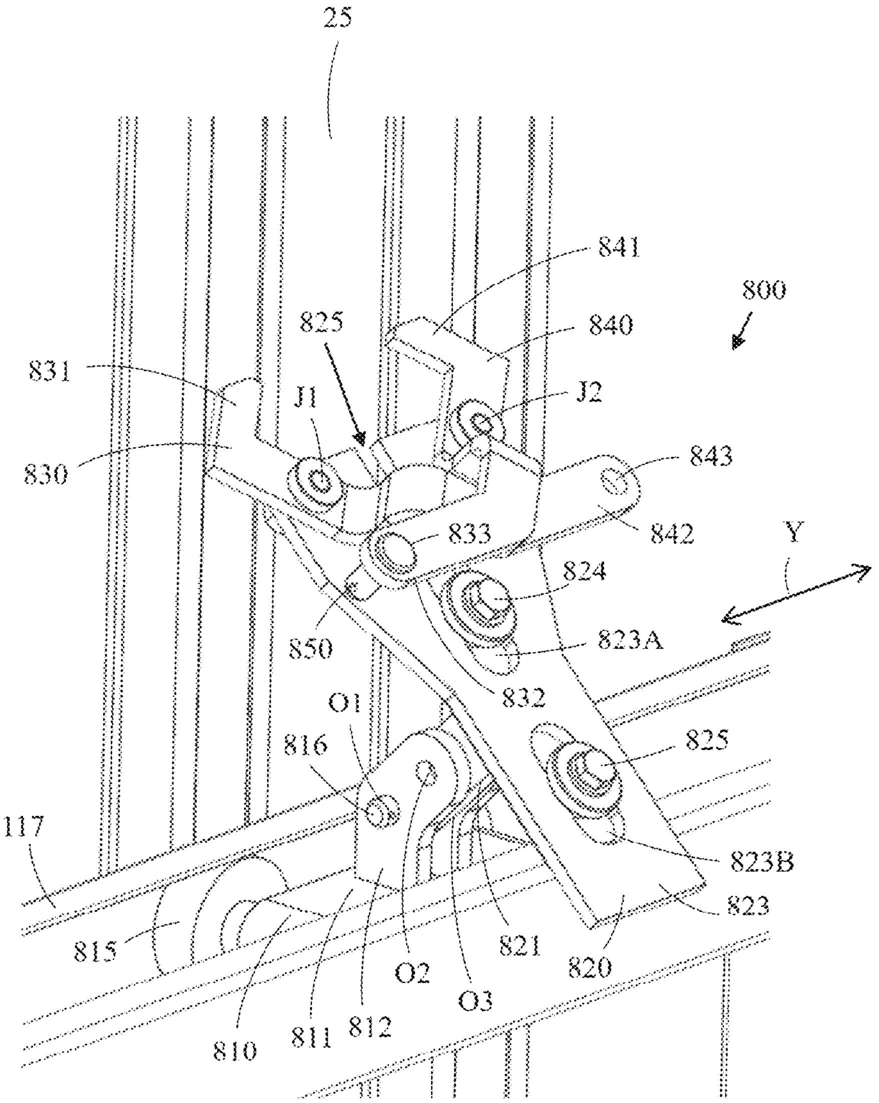
Figure 15:
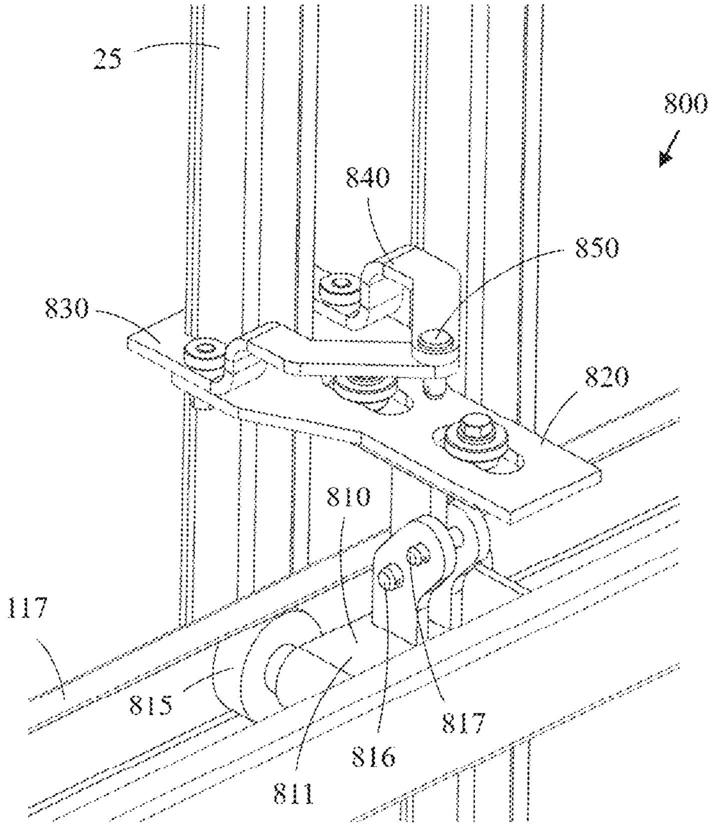
Figure 16:
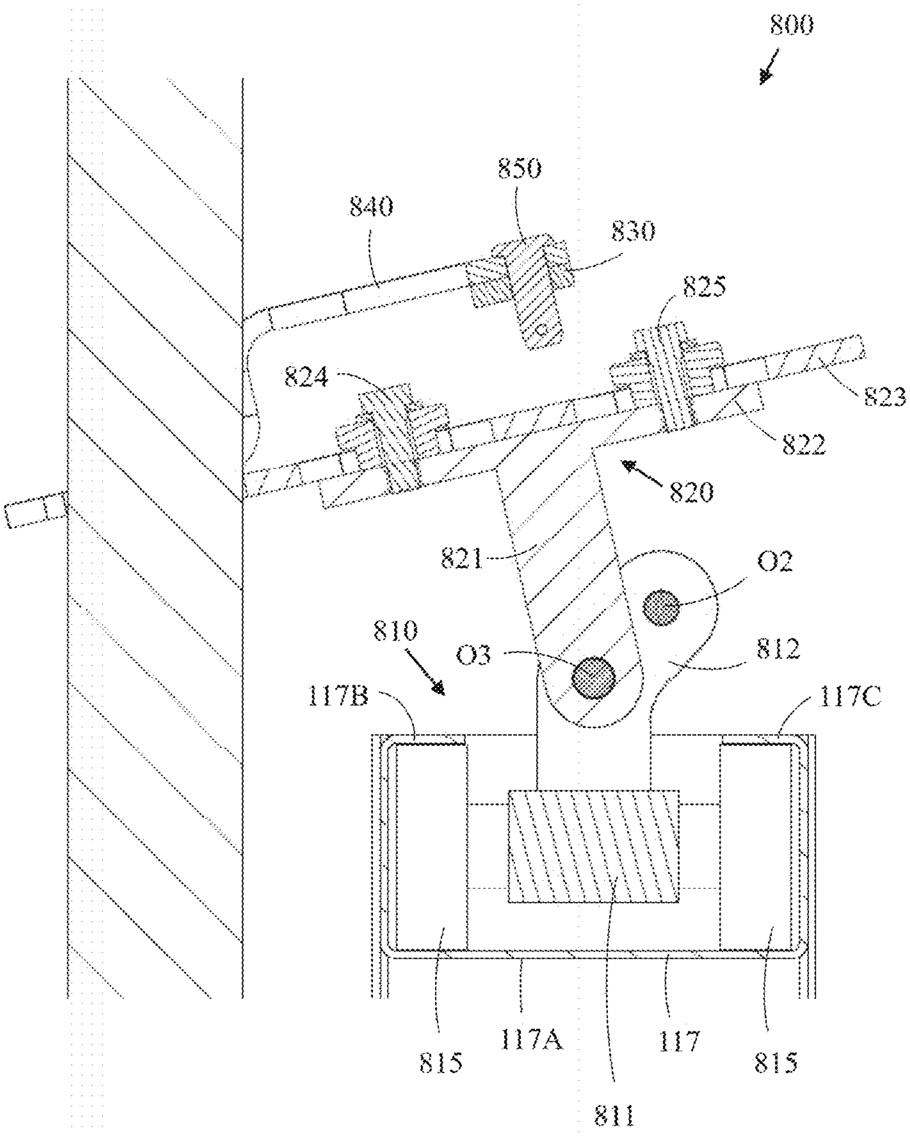

FIG. 5 shows a portion of a handrail of the installation platform in a contracted state, FIG. 6 shows the portion of the handrail of the installation platform in an extended state, FIG. 7 shows an isometric view of an extendable beam for the installation platform, FIG. 8 shows a side view of the extendable beam for the installation platform, FIG. 9 shows a horizontal cross-sectional view of a deck in the installation platform, FIG. 10 shows a vertical cross-sectional view of an installation platform, FIG. 11 shows a cross-sectional view of an example of gripping means, FIG. 12 shows an isometric view of another example of gripping means, FIG. 13 shows an isometric view of the installation platform provided with guide rail magazines, FIG. 14 shows an isometric view of a securing device for guide rails in a non-operating position, FIG. 15 shows the securing device in an operating position, FIG. 16 shows a cross-section of the securing device in a locking position.

DETAILED DESCRIPTION

Figure 1:
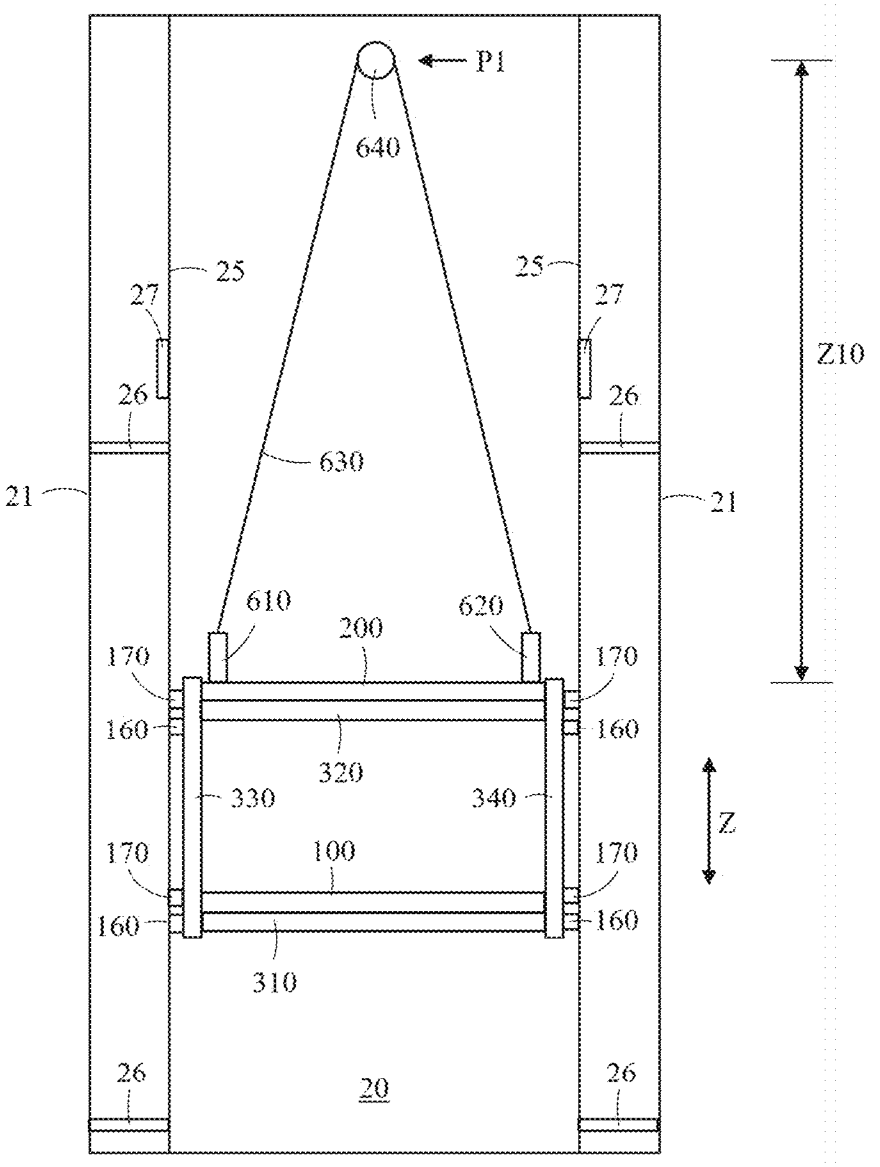
FIG. 1 shows a cross-sectional view of an installation platform.
Figure 2:
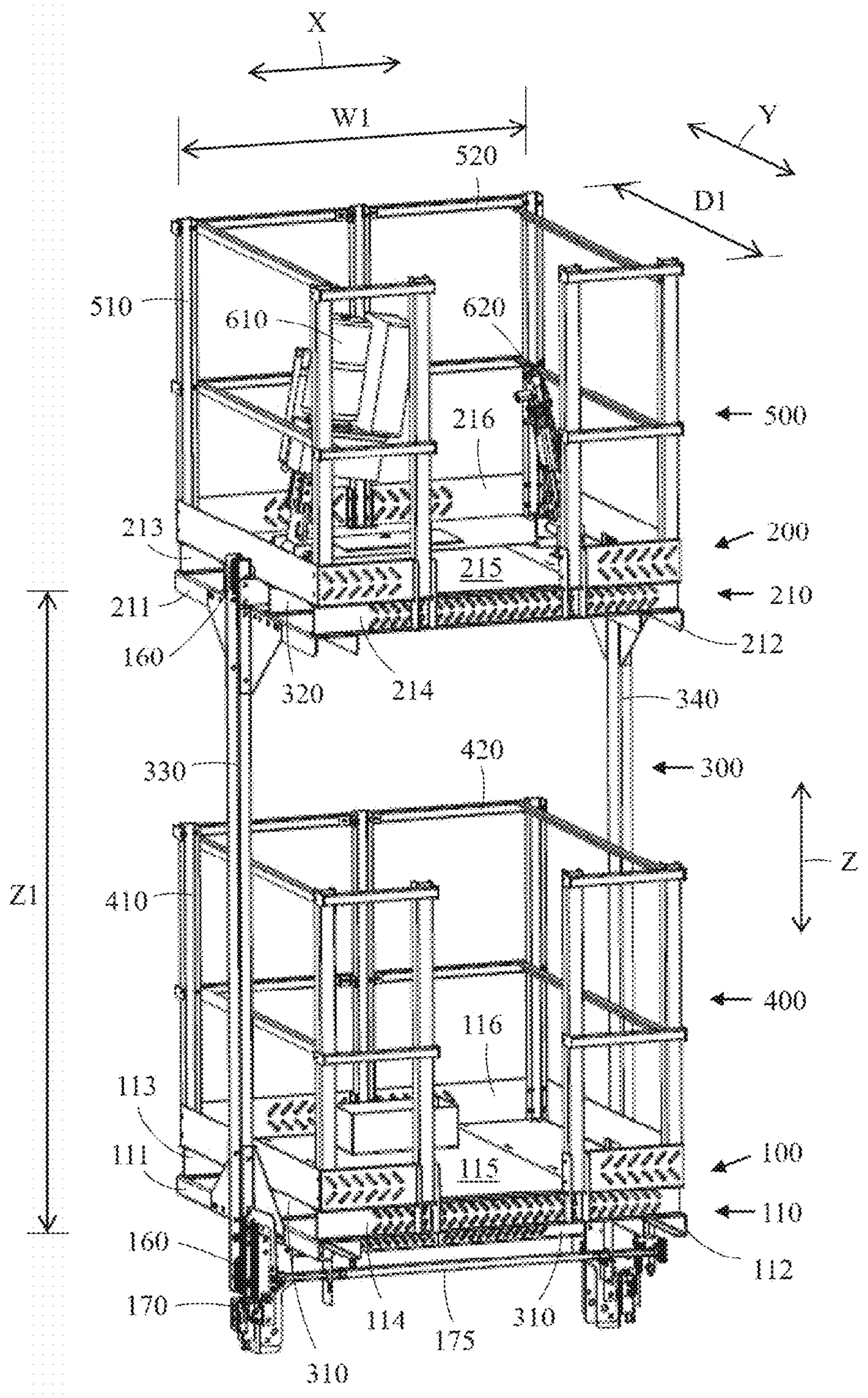
FIG. 2 shows an isometric view of the installation platform.

FIG. 1 shows a cross-sectional view of an installation platform and FIG. 2 shows an isometric view of the installation platform.

The figures show a vertical direction Z, a first horizontal direction X and a second horizontal direction Y. The first horizontal direction X is the direction between the guide rails 25. The second horizontal direction Y is perpendicular to the first horizontal direction X. The first horizontal direction X extends between the side walls in the shaft 20. The second horizontal direction Y extends between the back wall and the front wall in the shaft 20.

The figure shows further a width W1 of the installation platform. The width W1 extends in the first horizontal direction X between the guide rails 25. The figure shows further a depth D1 of the installation platform. The depth D1 extends in the second horizontal direction Y.

The installation platform may be movably supported on guide rails 25 which are supported with brackets 26 on the walls 21 of a shaft 20. The guide rails 25 may be formed of guide rail elements. The opposite ends of two consecutive guide rail elements may be connected to each other with guide rail fixing means. The guide rail fixing means may be formed of connecting elements, e.g. fish plates 27. The guide rail elements may have a certain length e.g. 5 meters. The guide rail elements may be attached with guide rail fixing means e.g. brackets 26 to the walls 21 in the shaft 20. There may be brackets 26 near both ends of the guide rail elements. Only a bottom portion of the shaft 20 is shown in FIG. 1.

The installation platform may comprise a first deck 100, a second deck 200, and a support frame 300 supporting the decks 100, 200. The second deck 200 may be positioned above the first deck 100 in the vertical direction Z. Each deck 100, 200 may comprise a bottom 110, 210 and handrail constructions 400, 500 (shown in FIG. 2). The first deck 100 may form a lower deck and the second deck 200 may form an upper deck. The installation of the guide rails and other equipment of the elevator may be done manually and/or automatically from both decks 100, 200 in the installation platform.

The installation platform may be lifted with a hoist 610. The hoist 610 may be supported on the upper deck 200. A hoisting rope 630 may pass over a rope pulley 640 supported in a support point P1 in the shaft 20 at a distance Z10 above the installation platform. The other end of the rope 630 may be supported on a fastener 620 being supported on the upper deck 200. The hoist may be a Tirac™ hoist in which the rope 630 runs between traction sheaves. Rotation of the traction sheaves in the hoist 610 in a first direction moves the hoist 610 in a first direction and rotation of the traction sheaves in the hoist 610 in a second opposite direction moves the hoist 610 in a second opposite direction. The installation platform will move upwards and downwards along with the hoist 610 as the hoist 610 is supported on the installation platform. The installation platform hangs from the hoist via a rope pulley 640 positioned in the support point P1 in the shaft 20.

The hoist 610 shown in the figure forms one example of a hoist that may be used in the invention. A hoist hanging from the support point P1 in the shaft 20 above the installation platform could also be used in the invention. The installation platform would then hang directly from the hoist 610 with a hoisting rope 630, i.e. there would be no need for a separate rope pulley 640.

The installation platform hangs in both cases from the hoist 610 with a hoisting rope 630 passing either directly from the hoist 610 to the installation platform or passing from the hoist 610 via a rope pulley 640 to the installation platform. It would naturally also be possible to use several rope pulleys 640 if needed. The installation platform would then hang from the hoist 610 with a hoisting rope 630 passing from the hoist 610 either directly or via at least one rope pulley 640 to the installation platform. It would naturally also be possible to use several hoist 610 working in parallel to lift the installation platform.

The support frame 300 may comprise horizontal support beams 310, 320 supporting a respective deck 100, 200 and vertical support beams 330, 340 extending between the horizontal support beams 310, 320. The support frame 300 may comprise a first horizontal support beam 310 supporting the first deck 100 and a second horizontal support beam 320 supporting the second deck 200. A vertical support beam 330, 340 may extend vertically between respective outer ends of the horizontal support beams 310, 320. The support frame 300 may have a generally rectangular shape. The support beams 310, 320, 330, 340 in the support frame 300 may have a substantially U-shaped cross-section. The vertical support beams 330, 340 may be positioned so that the U opens outwards towards the guide rails 25.

The first horizontal support beam 310 and the second horizontal support beam 320 in the support frame 300 may extend in the first horizontal direction X. The second horizontal support beam 320 may be positioned at a vertical distance Z1 above the first horizontal support beam 310. The second deck 200 may thus be positioned at the vertical distance Z1 above the first deck 100.

The support frame 300 may have a similar construction as a sling of an elevator car.

The installation platform may further comprise guide means 160 for guiding the installation platform movably on the guide rails 25. The guide means 160 may be supported on the support frame 300 e.g. on the vertical support beams 330, 340 of the support frame 300. The guide means 160 may be positioned within the vertical support beams 330, 340 and/or outside the vertical support beams 330, 340 in the support frame 300. The installation platform may be movable with the hoist 610 in the vertical direction Z along the guide rails 25. The guide means 160 guide the installation platform on the guide rails 25 so that only movement in the vertical direction Z along the guide rails 25 is possible. The guide means 160 keep the installation platform stable in the horizontal plane during vertical movement of the installation platform.

The guide means 160 may be formed of a roller arrangement, whereby the rollers roll on the guide surfaces of the guide rails 25. The roller arrangement may correspond to a roller arrangement used in elevator cars for guiding the elevator car on the guide rails. The guide means 160 may on the other hand be formed of glide arrangement, whereby glide means glide on the guide surfaces of the guide rails 25. The glide arrangement may correspond to a glide arrangement used in elevator cars for guiding the elevator car on the guide rails.

The installation platform may further comprise gripping means 170 for securing the installation platform to the guide rails 25 and/or on guide rail fixing means. The gripping means 170 may be formed of a safety gear eliminating unintentional falling of the installation platform. The gripping means 170 may be positioned on opposite vertical sides of the installation platform. The gripping means 170 may be supported on the installation platform and act on the guide rails 25 and/or on guide rail fixing means. The guide rail fixing means may be formed of fish plates 27 attaching the ends of guide rail elements together and/or of brackets 26 attaching the guide rails 25 to the walls 21 of the shaft 20. The gripping means 170 may grip the guide rails 25 and/or the fish plates 27 and/or the brackets 26. The gripping means 170 may secure the installation platform to the guide rails 25 in the shaft 20. Some examples of gripping means 170 will be explained more in detail in connection with FIGS. 11 and 12.

A synchronization shaft 175 may connect the gripping means 170 on opposite sides of the support frame 300 together.

The first deck 100 may comprise a first bottom 110 and a first handrail construction 400 being supported on the first bottom 110. The second deck 200 may comprise a second bottom 210 and a second handrail construction 500 being supported on the second bottom 210. The bottom 110, 210 in each deck 100, 200 may be formed of horizontal support beams. A floor may be formed on the horizontal support beams. The first bottom 110 and the second bottom 210 may be substantially rectangular.

The bottom 110 in the first deck 100 may comprise two first horizontal support beams 111, 112 running in the first horizontal direction Y. The two first horizontal support beams 111, 112 may be positioned at opposite outer edges of the bottom 110 of the deck 100. The two first horizontal support beams 111, 112 may be supported on the respective vertical support beam 330, 340 of the support frame 300. The two first horizontal support beams 111, 112 may run on a bottom surface of the first horizontal support beam 310 of the support frame 300 and on an inner surface of the respective vertical support beam 330, 340 of the support frame 300.

The bottom 110 in the first deck 100 may further comprise second horizontal support beams 113, 114 running in the first horizontal direction X. The two second horizontal support beams 113, 114 may be positioned at opposite outer edges of the bottom 110 of the first deck 100. The two second horizontal support beams 113, 114 may be supported on the outer ends of the first horizontal support beams 111, 112. The two second horizontal support beams 113, 114 and the first horizontal support beam 310 of the support frame 300 form a support for the floor 115 of the first deck 100. The first horizontal support beam 310 of the support frame 300 is positioned substantially in the middle of the floor 115. The floor 115 in the first deck 100 may be formed of a grid construction. The grid construction may comprise several pieces of grid overlapping each other. The size of the floor 115 may thus be adjusted in the first horizontal direction X and/or in the second horizontal direction Y by adjusting the overlapping of the grid pieces.

The first handrail construction 400 in the first deck 100 may comprise vertical support beams 410 and horizontal support beams 420 forming a cage. The vertical support beams 410 extend upwards from the bottom 110 of the first deck 100. There may be vertical support beams 410 in the corners of the bottom 110 of the first deck 100 and on the sides of the bottom 110 of the first deck 100. A passage may be arranged at the front of the first deck 100 in the cage. Service personnel may walk into the first deck 100 from a landing opening through the passage in the first deck 100 and out from the first deck 100 through the passage and a landing opening in the shaft. The first handrail construction 400 may further comprise horizontal support beams 420 extending between the vertical support beams 410. A first set of horizontal support beams 420 may be positioned at the upper ends of the vertical support beams 410 and a second set of horizontal support beams 420 may be positioned at the middle of the height of the vertical support beams 410. The first handrail construction 400 may form a safety device on the first deck 100.

There may further be horizontal support plates 116 surrounding the lower edges of the vertical support beams 410 in the handrail construction 400. These horizontal support plates 116 may support the vertical support beams 410 in relation to each other. These horizontal support plates 116 may further support the vertical support beams 410 in relation to the bottom 110 of the first deck 100.

The construction of the second deck 200 may be identical with the construction of the first deck 100.

The second deck may 200 comprise two first horizontal support beams 211, 212 running in the second horizontal direction Y at opposite outer edges of the bottom 210 of the second deck 200. The second deck 200 may further comprise two second horizontal support beam 213, 214 running in the first direction X at opposite outer edges of the bottom 210 of the second deck 200.

The floor 215 in the second deck 200 may, in the same way as the floor 115 in the first deck 200, be formed of a grid construction. The grid construction may comprise several pieces of grid overlapping each other. The size of the floor 215 may thus be adjusted in the first direction X and/or in the second direction Y by adjusting the overlapping of the grid pieces.

The second handrail construction 500 of the second deck 200 may be identical with the first handrail construction 400 of the first deck 100. The second handrail construction may thus comprise vertical support beams 510 and horizontal support beams 520 forming a cage.

There may further be horizontal support plates 216 surrounding the bottom 210 of the second deck 200 at the bottom end of the vertical support beams 510 of the second handrail construction 500. These horizontal support plates 216 may support the vertical support beams 510 in relation to each other and in relation to the bottom 210 of the second deck 200.

The hoist 610 and the fastener 620 is also shown in FIG. 2.

Figure 3:
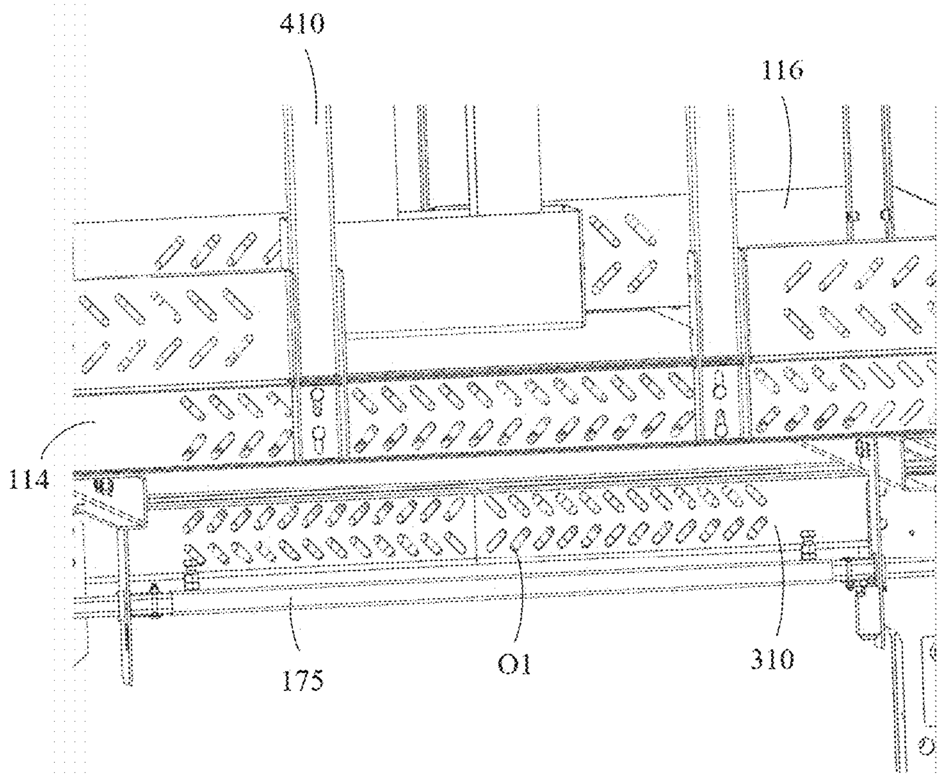
FIG. 3 shows an enlargement of a portion of the installation platform.

FIG. 3 shows an enlargement of portion of the installation platform.

Each of the horizontal support beams in the bottom 110, 210 of the decks 100, 200 may be formed of two separate beams being arranged to form a telescopic structure. Each of the two separate beams may be provided with inclined longitudinal openings O1. The two separate beams forming the telescopic structure may be attached to each other with bolts passing through the inclined longitudinal openings O1. The horizontal support beams 113, 114, 213, 214 in the decks 100, 200 extending in the first horizontal direction X may thus be extendable in said first horizontal direction X. The horizontal support beams 111, 112, 211, 212 in the decks 100, 200 extending in the second horizontal direction Y may thus be extendable in said second horizontal direction Y.

The horizontal support beams 310, 320 in the support frame 300 may in the same way be formed of two separate beams being arranged to form a telescopic structure and provided with inclined longitudinal openings O1. The length of the horizontal support beams 310, 320 in the support frame 300 may thus be adjusted in the first horizontal direction X.

The length of the telescopic structure may thus be changed by opening and removing the bolts, changing the position of the two separate beams in relation to each other, and inserting and fastening the bolts.

This is one possibility of realizing a telescopic structure in the horizontal support beams 111, 112, 113, 114, 211, 212, 213, 214 in the bottom of the decks 100, 200 and in the horizontal support beams 310, 320 in the support frame 300.

The first deck 100, the second deck 200 and the support frame 300 may as a first option be constructed so that only the horizontal support beams 113, 114, 213, 214 in the decks 100, 200 extending in the first horizontal direction X and the horizontal support beams 310, 320 in the support frame 300 are adjustable. This means that only the width W1 of the installation platform is adjustable. The installation platform may thus be adapted to different shafts 20 having different distances in the first direction X between the guide rails 25.

The first deck 100, the second deck 200 may as a second option be constructed so that only the horizontal support beams 111, 112, 211, 212 in the decks 100, 200 extending in the second horizontal direction Y are adjustable. This means that only the depth D1 of the installation platform is adjustable. The installation platform may thus be adapted to different shafts 20 having different distances in the second horizontal direction Y between the back wall and the front wall of the shaft 20. The distance between the front edge of the decks 100, 200 and the landings could thus be kept at a minimum in order to eliminate accidents. The distance between the back edge of the decks 100, 200 and the back wall in the shaft 20 must not necessary be adjusted. The handrails at the back edge of the decks 100, 200 prevent mechanics from falling.

The first deck 100, the second deck 200 may as a third option be constructed so that the horizontal support beams 111, 112, 113, 114 211, 212, 213, 214 in the decks 100, 200 extending in the first horizontal direction X and in the second horizontal direction Y are adjustable. This means that the installation platform is adjustable in the width W1 direction and in the depth direction D1. The installation platform may thus be adapted to different shaft 20 having different distances in the first horizontal direction X between the guide rails 25 and in different distances in the second horizontal direction from the back wall to the front wall of the shaft 20.

Figure 4:
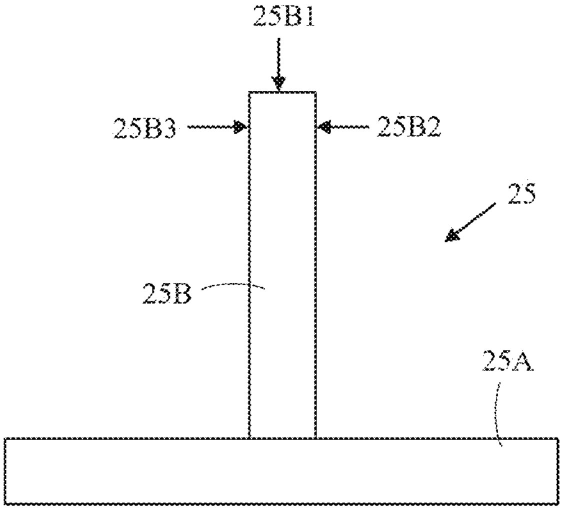
FIG. 4 shows a cross-sectional view of a guide rail.

FIG. 4 shows a cross-sectional view of a guide rail.

A cross-section of the guide rail 25 may have a general form of an inverted letter T. The guide rail 25 may comprise a bottom part 25A from which the guide rail 25 may be attached with brackets 26 to the wall constructions in the shaft 20. The guide rail 25 may further comprise a guide part 25B extending perpendicularly outwards from the bottom part 25A. The guide part 25B may extend outwards from a middle of the bottom part 25A. The guide part 25A may comprise a front guide surface 25B1 on the outer edge of the guide part 25B and two opposite side guide surfaces 25B2, 25B3 on the opposite side surfaces of the guide part 25B. The guide means 160 of the installation platform may roll or glide on the guide surfaces 2561, 25B2, 2563 of the guide rail 25. The guide means 160 may roll or glide on the guide surfaces 2561, 2562, 2563 of the guide rail 25.

FIG. 5 shows a portion of a handrail of the installation platform in a contracted state and FIG. 6 shows the portion of the handrail of the installation platform in an extended state.

The horizontal support beam 420 extending in the first direction X is shown in a contracted state in FIG. 5 and in an expanded state in FIG. 6. The horizontal support beam 420 has thus a telescopic structure. The horizontal support beam 420 may be formed of two separate beams 421, 422 being movable in relation to each other. The beams 421, 422 may have a rectangular cross-section. The cross-section of the first beam 421 may be smaller than the cross-section of the second beam 422. The first beam 421 may thus glide inside the second beam 422. The length of the support beam 420 may thus be changed by changing the length of the portion of the first beam 421 that is inside the second beam 422. The first beam 421 is pushed fully into the second beam 422 in FIG. 5 and the first beam 421 is drawn fully out from the second beam 422 in FIG. 6.

The horizontal support beam 420 extending in the second direction Y may be of an identical construction as the horizontal beam 420 extending in the first direction X.

FIG. 7 shows an isometric view of an extendable beam for the installation platform and FIG. 8 shows a side view of the extendable beam for the installation platform.

The extendable support beam 113 shown in the FIGS. 7 and 8 forms an alternative to the extendable support beam 113 shown in FIG. 3. The telescopic structure is different in these two embodiments.

The support beam 113 may comprise a middle portion 113A, and two opposite end portions 113B, 113C. The cross-section of the support beam 113 may be generally rectangular. The cross-section of the end portions 113B, 113C may be smaller so that they may glide inside the middle portion 113A. Opposite edges of the end portions 113B, 113C may comprise a groove receiving a corresponding protrusion in the corresponding edges of the middle portion 113A. Locking means 113D may be arranged in the opposite end portions of the middle portion 113A. The locking means 113D may lock the respective end portions 113B, 113C in relation to the middle portion 113A. Turning the locking means 113D in a counter-clockwise direction opens the locking between the middle portion 111A and the respective end portion 113B, 113C. The respective end portion 113B, 113C may thus be moved in relation to the middle portion 113A in order to adjust the length of the support beam 113. Turning the locking means 113D in a clockwise direction locks the respective end portion to the middle portion 113A. The locking means 113A may be formed of a bolt and a nut.

FIG. 9 shows a horizontal cross-sectional view of a deck in the installation platform and FIG. 10 shows a vertical cross-sectional view of the installation platform.

The installation platform may be movably guided with guide means 160 on the guide rails 25. The bottom in the second deck 200 may be provided with first fastening means 231 for the hoist 610 and second fastening means 232 the fastener 620. The bottom 110, 210 of each deck 100, 200 may further be provided with an opening 221 extending in the second horizontal direction Y. A shaft 222 extend across the opening 221 in the first horizontal direction X. The shaft 222 may be positioned at the middle of the deck 200. The rope 630 of the hoist 610 may pass downwards through the opening 221 in the situation when the hoist 610 is used to lift a car positioned below the installation platform upwards in the jump phase. The shaft 222 prevents the rope 630 from falling down through the opening 221 if the fastening of the rope 630 breaks.

The floor 115, 215 in each deck 100, 200 of the installation platform may be formed of sheets and pieces of grids on the sheets. The floor may be formed of several overlapping sheet pieces and grid pieces. The sheet pieces and the grid pieces may have a substantially rectangular form. The sheet pieces may be made of polycarbonate or of water-resistant plywood. The grid pieces may be made of glass reinforced plastic or some other grid material having corresponding properties. The sheet pieces prevent small objects from falling through the floor of the deck 100, 200. The grid pieces prevent slipping.

The installation platform may further be provided with guide rail magazines 710. This embodiment shows four guide rail magazines 710, but there could be any number of guide rail magazines 710 supported on the installation platform. The guide rail magazines 710 may be supported on the side edges that extend in the first horizontal direction X of the installation platform.

The guide rail magazines 710 may be attached to the first deck 100 and to the second deck 200. The guide rail magazines 710 may also support the installation platform in the vertical direction i.e. they will increase the rigidity of the installation platform.

An alternative position of the guide rail magazines 710 is also indicated in FIG. 8. In cases where there is not enough room in the shaft 20, the guide rail magazines 710 may be positioned inside the outer perimeter of the installation platform.

FIG. 11 shows a cross-sectional view of an example of gripping means.

The installation platform is normally lifted and lowered with the hoist 610. A safety brake may be used as a safety device in the installation platform. The safety brake may allow the installation platform to move upwards but prevents the installation platform from falling downwards in an uncontrolled manner. The safety brake grips on the guide rails when the installation platform falls in an uncontrolled manner. Any prior art safety brake may be used in this connection.

A safety break forms thus a kind of a gripping means. The installation platform may as an alternative to the safety brake or in addition to the safety brake be provided with other kind gripping means.

The gripping means 170 shown in FIG. 11 forms one example of a gripping means that may be used in connection with the installation platform as an alternative or in addition to a safety brake.

The gripping means 170 may be formed of brake means 180. The brake means 180 may comprise a frame 181 with a slit for the guide rail 25 and two wedge shaped brake shoes 182 positioned on opposite sides of the guide rail 25. The brake shoes 182 may be movably supported from the wedge surface with rollers 183 on the frame 181. A spring 184 may be positioned between a first end of the brake shoe 182 and the frame 181. A second opposite end of the brake shoe 182 may be supported on a slide 185 acting in a cylinder 186.

A hydraulic power unit 189 may provide power to the brake means 180. A hydraulic pump may pump oil from an oil reservoir to the cylinders 186 in order to move the slides 185 in the cylinders 186.

Supplying pressurized fluid to the plungers 185 in the cylinders 186 will press the brake shoes 182 downwards in the figure against the force of the springs 184. The brake shoes 182 are thus moved away from the guide surfaces of the guide rail 25. The installation platform is thus free to move on the guide rails 25.

Extracting pressurized fluid from the cylinders 186 will allow the brake shoes 182 to move upwards in the figure due to the force caused by the springs 184 acting on the second end of the brake shoe 182. The brake shoes 182 are thus moved into contact with the guide surfaces of the guide rail 25. The installation platform will thus become locked to the guide rails 25.

The hydraulic unit 189 may be provided only for the brake means 180. Another possibility is to have a common main hydraulic unit on the installation platform for all equipment needing hydraulic power on the installation platform. Hydraulic valves may be used to connect the different equipment to the common main hydraulic power unit.

The brake means 180 may as an alternative be operated electromechanically. An electromechanical device may be used to press the brake shoes 182 against the force of the springs 184. Deactivation of the electromechanical device will activate the brake shoes 182 against the guide rails 25.

FIG. 12 shows an isometric view of another example of gripping means.

The gripping means shown in FIG. 12 forms another example of a gripping means that may be used in connection with the installation platform either as an alternative or in addition to a safety brake.

The second gripping means 170 may be formed of anchoring means 190. The anchoring means 190 may comprise a frame 191 supported on the support frame 300 and two claws 192 positioned on opposite sides of the guide rail 25. The claws 192 may be supported via a first articulated joint J1 on the frame 191. An actuator may be attached to the claws 192 on an opposite side of the first articulated joint J1 (not shown in the figure). The actuator may rotate the claws 192 around the first articulated joint J1 between a locked position in which the claws 192 are seated on an upper support surfaces 27A of the fish plates 27 and an unlocked position in which the claws are rotated in a clockwise direction and thereby removed from contact with the fish plate 27.

The actuator may be formed of a hydraulic cylinder or of an electromechanical device. The claws 192 could be operated by an electric motor or by one or more electromechanical devices.

The installation platform becomes supported on the fish plate 27 in the locked position of the anchoring means 190. The support on the fish plate 27 eliminates downward movement of the installation platform. The installation platform is free to move on the guide rails 25 in the unlocked position of the anchoring means 190.

The fish plates 27 are normally positioned in the joint between two consecutive guide rail elements. Additional fish plates 27 could be positioned along the length of the guide rail elements. The guide rail element could be provided with intermediate fish plates 27 attached to the guide rail elements already before the installation of the guide rail elements. A fish plate 27 could e.g. be positioned in the middle of a 5 m long guide rail element. The intermediate fish plates 27 could be left on the guide rails permanently after the installation. Another possibility would be to remove the intermediate fish plates as the installation proceeds upwards.

The fish plate 27 may be wider than the guide rail 25 so that the upper surface of the fish plate 27 forms an upper support surface 27A for the claw 192 on each side of the guide rail 25. The construction of the fish plates 27 may thus be adapted to work as support points for the claws 192 in the anchoring means 190.

The fish plate 27 is an example of a connection element that may be used to connect the ends of consecutive guide rail elements.

A similar anchoring means 190 could be used to lock the installation platform to the brackets 26 attaching the guide rails 25 to the walls 21 in the shaft 20. The claws 192 could then interact with brackets 26.

FIG. 13 shows an isometric view of the installation platform provided with guide rail magazines.

The installation platform with the two decks 100, 200 may be provided with guide rail magazines 710. Guide rail elements 25 may thus be stored on the installation platform for a certain need. The guide rail magazines 710 may be re-filled when the installation of guide rails progresses in the shaft. This may be done e.g. through a landing in the shaft or with a hoist connected to the installation platform.

Each deck 100, 200 is provided with handrail constructions 400, 500.

The hoist 610 and the fastener 620 is also shown in the figure.

FIG. 14 shows an isometric view of a securing device for guide rails in a non-operating position, FIG. 15 shows the securing device in an operating position, and FIG. 16 shows a cross-section of the securing device in a locking position.

The securing device 800 may comprise a frame 820, a carrier 810, gripping means 830, 840, and a locking device 817.

The frame 820 may be pivotably 816 supported on the carrier 810.

The gripping means 830, 840 may be pivotably J1, J2 supported on a first end of the frame 820. The securing means 830, 840 may have a closed position in which the securing means 830, 840 enclose the guide rail element and an open position in which the securing means 830, 840 is disconnected from the guide rail element.

The locking device 817 may prevent the frame 820 of the securing device 800 from turning around the pivot point 816 upwards above the horizontal plane. The locking device 817 may on the other hand allow the frame 820 to turn downwards around the pivot point 816. The guide rail element is thus free to move upwards within the securing means 830, 840 but falling of the guide rail element is prevented as the frame 820 turns downwards around the pivot point 816 when the guide rail element moves downwards so that the guide rail element becomes locked against the edges of the securing means 830, 840.

The carrier 810 may be movable. The carrier 810 may comprise a frame 811 and rollers 815 supported on the frame 811. The carrier 810 may be supported through the rollers 815 on a horizontal support beam 117 extending in the second direction Y. A pair of support arms 812 may be attached to the frame 811 of the carrier 810. The pair of support arms 811 may extend upwards from the frame 811 of the carrier 810. Each support arm in the pair of support arms 812 may comprise two holes O1, O2 passing through the support arms 812. The two holes O1, O2 may extend in the horizontal direction through the support arms 812. The rollers 815 of the carrier 810 may be supported on support surfaces 117A, 117B, 117C in the horizontal support beam 117. The carrier 810 may comprise four rollers 815.

The frame 820 of the securing device 800 may comprise a first support plate 822 and a second support plate 823. An end of the support arm 821 may be attached to the first support plate 822. The support arm 821 may extend downwards from the first support plate 822. The first support plate 823 may be attached to a bottom of the second support plate 823 with two bolts 824, 825. The bolts 824, 825 may pass through oblong holes 823A, 823B in the second support plate 823. The support arm 821 may extend between the pair of support arms 812 of the carrier 810. The support arm 821 may comprise a hole O3 passing through the support arm 821. The hole O3 may extend in the horizontal direction through the support arm 821.

The support arm 821 of the frame 820 of the securing device 800 may be attached to the support arms 812 of the carrier 810 with a horizontal pin 816 passing through the first holes O1 in the support arms 812 of the carrier 810 and the support arm 821 of the frame 820 of the securing device 800. The pin 816 forms a pivot point for the frame 820 of the securing device 800 in relation to the carrier 810.

The securing means 830, 840 of the securing device 800 may be formed of two jaws 830, 840. Each jaw 830, 840 may be supported through a respective articulated joint J1, J2 on a first end of the frame 820 i.e. on a first end of the second support plate 823. Each jaw 830, 840 may have a first end 831, 841 at one side of the articulated joint J2, J3 and a second end 832, 842 at the opposite side of the articulated joint J2, J3. The second end 832, 842 in each jaw 830, 840 may comprise a hole 833, 843 passing through the jaw 830, 840.

The securing device 800 may further comprise a locking pin 850. The locking pin 850 may be formed of a separate pin which may lock the jaws 830, 840 to each other in the closed position of the jaws 830, 840. The two jaws 830, 840 may glide upon each other so that the holes 833, 843 in the second end 832, 842 of the jaws 830, 840 become overlapping when the jaws 830, 840 are in the closed position. The locking pin 850 may then be pushed through the holes 833, 843 in the second end 832, 842 of the jaws 830, 840 so that the jaws 830, 840 become locked in the closed position. The second end 832 of the first jaw 830 glides on the second end 842 of the second jaw 840 in the figure. The second ends 832, 842 of the jaws 830, 840 move in superposed planes when the jaws 830, 840 are opened and closed. The first ends 831, 841 of the jaws 830, 840 move in a common plane when the jaws 830, 840 are opened and closed.

The locking pin 850 may on the other hand be spring loaded in the hole 833 of the first jaw 830. The locking pin 850 would then be lifted against the spring force when the jaws 830, 840 are closed so that the holes 833, 843 in the second ends 832, 842 may be superposed on each other. The locking pin 850 could then be released so that the spring pushes the locking pin 850 into the second hole 843. The jaws 830, 840 will then be locked in the closed position.

The jaws 830, 840 are in an open position in FIG. 14 and in a closed position in FIGS. 15 and 16. The securing device 800 surrounds the guide rail 25 in the closed position of the jaws 830, 840. The first ends 831, 841 of the jaws 830, 840 are positioned behind the bottom part 25A of the guide rail 25 and the guide part 25B of the guide rail 25 is positioned in the slot 825 in the frame 820 i.e. in the second frame 823 of the securing device 800. There is a play between the guide rail 25 and the securing device 800 when the jaws 830, 840 in the securing device 800 are closed and the securing device 800 is in a horizontal position. The guide rails 25 may thus move vertically upwards in relation to the securing device 800.

The locking device 817 may be formed of a second pin 817. The second pin 817 may be pushed through the second holes O2 in the support arms 812 of the carrier 810 in the operational position of the securing device 800 as seen in FIG. 15. The second pin 817 prevents the securing device 800 i.e. the frame 820 of the securing device from rising above the horizontal position when the guide rail element 25 is moved upwards. The securing device 800 may, however, turn downwards around the pivot point formed by the first pin 816 when the guide rail element 25 moves downward. When the securing device 800 turns downwards as seen in FIG. 16 the guide rail element 25 becomes locked by the securing device 800. The bottom surface of the bottom part 25A of the guide rail element 25 will be pressed against the edges of the first ends 831, 841 of the claws 830, 840 and the outer end surface 25B1 of the guide part 25B of the guide rail element 25 will be pressed against the bottom of the slot 825 of the frame 820 of the securing device 800. The securing device 800 will thus prevent unintentional falling of the guide rail element 25.

The figures show advantageous embodiments of the inventive installation platform. The invention is, however, not limited to these embodiments. The support frame 300 could e.g. instead of one sling be formed of two or more parallel slings. The arrangement and the number of support beams in the decks could be different, etc.

The installation of guide rails 25 may be done manually and/or automatically from the installation platform. Mechanics and/or robots may work on the installation platform.

The installation platform may in addition to the installation of the guide rails be used in the installation of the shaft doors and installation of any equipment in the shaft which might be needed in the elevator.

The use of the invention is not limited to the installation of any specific elevator type. The invention can be used in the installation of any type of elevator e.g. also in elevators lacking a machine room and/or a counterweight. The counterweight could be positioned on the back wall of the shaft or on either side wall of the shaft or on both side walls of the shaft. The hoisting machinery could be positioned anywhere within the shaft.

It will be obvious to a person skilled in the art that, as the technology advances, the inventive concept can be implemented in various ways. The invention and its embodiments are not limited to the examples described above but may vary within the scope of the claims.

The invention claimed is:

1. An installation platform for installing an elevator during construction of a building, the installation platform having a width in a first horizontal direction between guide rails, a depth in a second horizontal direction perpendicular to the first horizontal direction, the installation platform comprising:

a first deck and a second deck positioned at a vertical distance above the first deck, the first deck being a bottommost deck, a support frame comprising horizontal support beams for supporting a respective deck, and vertical support beams extending between the horizontal support beams, the horizontal support beams extending in a first horizontal direction between guide rails, a second horizontal direction being perpendicular to the first horizontal direction, guide means for guiding the installation platform movably on the guide rails, wherein at least one of the width and the depth of each of the first deck and the second deck is adjustable by the horizontal support beams in order to adjust horizontal dimensions of each of the first deck and the second deck according to horizontal dimensions of a shaft, the horizontal support beams including end portions configured to adjustable extend from an interior of the horizontal support beams on either end of the horizontal support beams.

2. The installation platform according to claim 1, wherein the width of the installation platform is adjustable so that a width of the first deck, a width of the second deck, and a width of the support frame are adjustable in the first horizontal direction.

3. The installation platform according to claim 1, wherein the depth of the installation platform is adjustable so that a depth of the first deck and a depth of the second deck are adjustable in the second horizontal direction.

4. The installation platform according to claim 1, wherein the width and the depth of the installation platform are adjustable so that a width of the first deck, a width of the second deck, and a width of the support frame are adjustable in the first horizontal direction and a depth of the first deck and a depth of the second deck are further adjustable in the second horizontal direction.

5. The installation platform according to claim 1, wherein the first deck comprises a first bottom and a first handrail construction being supported on the first bottom and the second deck comprises a second bottom and a second handrail construction being supported on the second bottom.

6. An installation platform according to claim 5, wherein the first bottom, the first handrail construction, the second bottom, and the second handrail construction are adjustable in the horizontal plane at least in one of the first horizontal direction and the second horizontal direction.

7. The installation platform according to claim 5, wherein the bottom of the first deck and the bottom of the second deck comprises first support beams extending in the second horizontal direction and second support beams extending in the first horizontal direction, the first support beams and/or the second support beams having a telescopic structure making it possible to adjust a length of the first support beams and/or the second support beams.

8. The installation platform according to claim 5, wherein the first handrail construction and the second handrail construction are formed of vertical support beams supported on the decks and horizontal support beams extending between the vertical support beams, the horizontal support beams in the first horizontal direction and/or the horizontal support beams in the second horizontal direction having a telescopic structure making it possible to adjust a length of the horizontal support beams.

9. The installation platform according to claim 1, wherein the installation platform further comprises a securing device for preventing a guide rail element from falling during installation of the guide rail element.

10. The installation platform according to claim 9, wherein the securing device comprises a frame, a carrier, the frame being pivotably supported on the carrier, securing means being pivotably supported on a first end of the frame, the securing means having a closed position in which the securing means enclose the guide rail element and an open position in which the securing means is disconnected from the guide rail element, a locking device preventing the frame of the securing device from turning around the pivot point upwards above a horizontal plane, but allowing the frame to turn downwards around the pivot point, wherein the guide rail element is free to move upwards within the securing means but falling of the guide rail element is prevented as the frame turns downwards around the pivot point when the guide rail element moves downwards so that the guide rail element becomes locked against edges of the securing means.

11. The installation platform according to claim 1, wherein the installation platform further comprises a safety gear acting on the guide rails and preventing free fall of the installation platform.

12. The installation platform according to claim 1, wherein the installation platform further comprises at least one guide rail magazine receiving guide rail elements to be used in the installation of guide rails.

13. A method for installing an elevator during construction of a building, an installation platform having a width in a first horizontal direction between guide rails, a depth in a second horizontal direction perpendicular to the first horizontal direction, the installation platform comprising a first deck and a second deck positioned at a vertical distance above the first deck, the first deck being a bottommost deck, a support frame comprising horizontal support beams for supporting a respective deck, and vertical support beams extending between the horizontal support beams, the horizontal support beams extending in a first horizontal direction between guide rails, a second horizontal direction being perpendicular to the first horizontal direction, guide means for guiding the installation platform movably on the guide rails, wherein at least one of the width and the depth of the installation platform is adjustable, the method comprising:

selectively adjusting at least one of the width and the depth of at least one of the first deck and the second deck by the horizontal support beams in order to adjust horizontal dimensions of at least one of the first deck and the second deck to horizontal dimensions of a shaft, the horizontal support beams including end portions configured to adjustable extend from an interior of the horizontal support beams on either end of the horizontal support beams lifting the installation platform with a hoist in the shaft, installing elevator parts such as guide rail elements and landing doors from the installation platform.

14. The method according to claim 13 comprising storing guide rail elements in at least one a guide rail magazine provided on the installation platform.

15. The method according to claim 13 comprising securing a guide rail element to be installed from falling during installation of the guide rail element with a securing device attached to the installation platform.

16. The installation platform of claim 1, wherein the guide means extends from below the first deck to the second deck.

* * * * *